United States Patent [19]

Miller

[11] Patent Number: 4,619,597
[45] Date of Patent: Oct. 28, 1986

[54] APPARATUS FOR MELT ATOMIZATION WITH A CONCAVE MELT NOZZLE FOR GAS DEFLECTION

[75] Inventor: Steven A. Miller, Amsterdam, N.Y.

[73] Assignee: General Electric Company, Schenectady, N.Y.

[21] Appl. No.: 584,691

[22] Filed: Feb. 29, 1984

[51] Int. Cl.[4] .................................................. B22F 9/08
[52] U.S. Cl. .......................................... 425/7; 264/12; 425/10
[58] Field of Search .................... 264/5, 9, 11, 12, 82, 264/DIG. 75; 425/6, 7, 10; 65/5, 16

[56] References Cited

U.S. PATENT DOCUMENTS

| | | | |
|---|---|---|---|
| 1,856,679 | 5/1932 | Williams et al. | 425/7 |
| 2,571,457 | 10/1951 | Ladisch | 65/16 |
| 3,253,783 | 5/1966 | Probst et al. | 425/7 |
| 3,752,611 | 10/1973 | Reed et al. | 425/10 |

FOREIGN PATENT DOCUMENTS 53-49126  5/1978  Japan ......................................... 65/5

*Primary Examiner*—Jay H. Woo
*Assistant Examiner*—J. Fortenberry
*Attorney, Agent, or Firm*—Paul E. Rochford; James C. Davis, Jr.; Paul R. Webb, II

[57] ABSTRACT

A method for generating prime powder from a material having a high melting point and apparatus for generating the powder is taught. The apparatus includes a melt delivery tube. The melt of the high melting material is introduced into the tube and exits from the tube into an atomization zone. Gas is delivered to the zone at high pressure as a stream to atomize the melt. Pursuant to the present invention, the atomizing gas is directed against the lower end of the melt delivery tube and it is deflected from the melt delivery tube into contact with the descending high temperature melt. A concave surface is provided on the end of the melt delivery tube to deflect the gas along the tube surface to minimize Eddy currents and provide better control of the atomization process.

4 Claims, 6 Drawing Figures

APPARATUS FOR MELT ATOMIZATION WITH A CONCAVE MELT NOZZLE FOR GAS DEFLECTION

RELATED APPLICATIONS

The subject application is related to four copending applications as follows:
1. Method of Atomization of a Melt from a Closely Coupled Nozzle, Apparatus and Product Formed, Ser. No. 584,687, filed simultaneously herewith.
2. Atomization Nozzle with Boron Nitride Surfaces, Ser. No. 584,688, filed simultaneously herewith.
3. Apparatus and Method for Atomization of Unstable Melt Stream, Ser. No. 584,689, filed simultaneously herewith.
4. Method of Atomization at Elevated Pressure and Apparatus for Atomization, Ser. No. 584,690, filed simultaneously herewith.

The text of each of the related applications is incorporated herein by reference and each application is assigned to the same assignee as this application.

BACKGROUND OF THE INVENTION

Rapid Particle Solidification

This invention relates generally to the production of powders from a liquid melt by atomization and solidification. More particularly, it relates to the preparation of higher temperature materials in finely divided form by fluid atomization and to the apparatus in which such process is performed and the product obtained by the process.

For example, it may be applied to the production of powders from melts of superalloys.

There is a well established need for an economic means for producing powders of superalloys. Such powders can be used in making superalloy articles by powder metallurgy techniques. The present industrial need for such powders is expanding and will continue to expand as the demand for superalloy articles expands.

Presently only about 3% of powder produced industrially is smaller than 10 microns and the cost of such powder is accordingly very high.

A major cost component of fine powders, prepared by atomization and useful in industrial applications, is the cost of the gas used in the atomization. At present, the cost of the gas increases as the percentage of fine powder sought in an atomized sample is increased. Also, as finer and finer powders are sought the quantity of gas per unit of mass of powder produced increases. The gases consumed in producing powder, particularly the inert gases such as argon, are expensive.

There is at present a growing industrial demand for finer powders. Accordingly, there is a need to develop gas atomization techniques and apparatus which can increase the efficiency of converting molten alloy into powder, and to conserve the gas consumed in producing powder in a desired size range, particularly where the desired size range are growing smaller and smaller.

The production of fine powder is influenced by the surface tension of the melt from which the fine powder is produced. For melts of high surface tension production of fine powder is more difficult and consumes more gas and energy. The present typical industrial yield of fine powder of less than 37 micrometers average diameter from molten metals having high surface tensions is of the order of 25 weight % to about 40 weight %.

Fine powders of less than 37 micrometers (or microns) of certain metals are used in low pressure plasma spray applications. In preparing such powders by presently available industrial processes, as much as 60-75% of the powder must be scrapped because it is oversize. This need to selectively remove only the finer powder and to scrap the oversize powder increases the cost of usable powder.

Fine powder also has uses in the quickly changing and growing field of rapid solidification materials. Generally the larger percentage of finer powder which can be produced by a process or apparatus, the more useful the process or apparatus is in rapid solidification technology.

It is known that the rate of solidification of a molten particle of relatively small size in a convective environment such as a flowing fluid or body of fluid material is roughly proportional to the inverse of the diameter of the particle squared.

The following expression is accordingly pertinent to this relationship:

$$\overset{o}{T_p} \propto \frac{1}{D_p^2}$$

where
$T_p$ is the rate of cooling of the particle and
$D_p$ is the particle diameter.

Accordingly, if the average size of the diameter of the particles of the composition is reduced in half then the rate of cooling is increased by a factor of about four. If the average diameter is reduced in half again the overall cooling rate is increased sixteen fold.

It is desirable to produce powders of small particle size for some applications particularly those in which the rate of cooling of the particle is significant to the properties achieved. For example, there is a need for rapidly solidified powders of size smaller than 37 microns and particularly for the production of such powders by economic means.

In addition, for certain applications it is important also to have particles which have a small spectrum of particle sizes. Accordingly, if particles of a 100 micron size are desired for certain applications a process which produces most of the particles in the 80-120 micron range would have a significant advantage for many applications of such particles as compared for example to a process which produces most particles in the 60 to 140 micron range. There is also a significant economic advantage in being able to produce powder having a known or predictable average particle size as well as particle size range. The present invention improves the capability for producing such powder on an industrial scale.

If particles of 100 micron size are produced by a first process from a given molten liquid metal for a given application, and it is then learned how to produce particles with a 50 micron average size, this second process would permit a much more rapid cooling and solidification of the particles formed from the same molten liquid metal. The present invention teaches a method by which smaller particles may be formed in higher percentage from melts, including molten liquid metal. A more rapid solidification rate of such particles is achieved by this novel process partly because the particles produced are themselves smaller on the average and also because the production is repeatable and reproducible on an industrial scale.

The achievement of small particle size is advantageous for rapid cooling and for the attendant benefits which derive from rapid cooling of certain molten materials. Novel amorphous and related properties may be achieved in this way. The present invention makes possible the production of powders with such small particle size with attendant rapid cooling.

The powder metallurgy technology presently has a need for fine and ultrafine particles and particles in the size range of 10 to 37 microns in diameter. Particles having average particles in the particle size range of 10 micron to 37 micron are produced by this novel process of this invention.

The attainment of the smaller particle size may be found important in consolidation of the material by conventional powder metallurgy inasmuch as it has been observed that powder of smaller particle size can result in higher sintering rate. Also, it can be significant in the consolidation of the small particle size material with a material of larger particle size where such consolidation is found desirable based on higher packing density.

Present trends in power metallurgy are creating great interest in fine metal powders, that is, in powders having diameters less than 37 microns in diameter and also in ultrafine powders specifically powders having diameters of less than 10 microns. High surface tension in a melt material makes the formation of smaller size particles more difficult.

Conventional apparatus for producing powder from molten metals by atomization results in products depending on preparation methods and materials which have relatively broad spectra of particle sizes. The broad spectra of particle sizes are represented in FIG. 2 by the curves A, B, C and D. From examination of these curves it is evident that the particles range all the way from particle sizes of less than 10 micron to more than 100 microns. The percentage of particles of fine powder, i.e. less than 37 micron) produced by conventional technology is the range of about ~0 to 40%, and the percentage of ultrafine powder, i.e. less than 10 micron, produced is in the range of ~0-3%. Because of the low yield of the smaller particle powder which is formed in such products the cost of the production of the ultrafine powder can be excessive ranging up to hundreds and even thousands of dollars per pound.

The graphs of FIG. 3, and illustratively curve E of FIG. 3, shows that the range of particle sizes produced by the methods of this invention when operated in a fine powder mode are significantly better than the particle size range of existing conventional processes. The data on which the curves A, B, C and D of FIG. 3 is based is from a review article by A. Lawly, "Atomization of Specialty Alloy Powders" which appeared in the January 1981 issue of Journal of Metals.

The data in the Journal of Metals article, and for the Curves A, B, C and D is for powder formed from melts of superalloys. The data from which Curve E was prepared was also data from the preparation of powder from a superalloy melt so that the two sets of data are quite comparable.

It is known that there are large differences in the ease with which powder can be prepared from different families of alloys.

PARTICLE SIZE RANGES

FIG. 3 contains typical powder particle distributions for superalloy powders produced by different atomization technologies. Curve A is for argon gas atomized powder. Curves B, C and D are for powder produced by the rotating electrode process, rapid solidification rate process, and vacuum atomization, respectively.

The shaded area or band bordered by Curves E and F indicates the range of powder size distributions that are produced utilizing this invention when operated in the fine powder mode.

It is readily evident from the plot of the various curves of FIG. 3 that the powder prepared pursuant to the present process, and using the present apparatus has a range of particle sizes and cumulative particle sizes which are much smaller than those prepared by the conventional methods particularly in the smaller size range of about 60 microns and smaller.

The shaded area of the graph between lines E and F is an envelope displaying the region of the graph in which powder products may have been produced employing the methods and techniques of this invention to make fine powder.

From this chart, it is evident that the method of the present invention makes possible the formation of powder having between 10 and 37% of particles of 10 microns and under and makes possible the formation of powders having between 44 and 70 cumulative percent of particles less than 37 microns.

Higher yield of fine powder may be produced by the methods and apparatus of the present invention than are produced by other gas atomization methods and devices because practice of the invention results in transfers of energy more efficiently from the atomizing gas to the liquid metal to be atomized. One way in which this improved production of fines may be accomplished is by bringing the melt stream into unprecedented close proximity with the atomizing gas nozzle. This close proximity of the gas nozzle to the melt stream orifice is designated herein as close coupling. The advantages of the principle of close coupling has been recognized in the literature as discussed below. However, until now, no invention has allowed the use of this principle for high temperature materials. This is due at least in part to the problem of accretion of solidified high temperature melt on the atomizing gas nozzle as well as elsewhere on the atomizing apparatus.

ACCRETION ON PRIOR ART NOZZLES

A major problem associated with prior art gas atomization nozzles and methods has been the solidification of specks and globules of the atomized high temperature alloy on the nozzle surfaces. The resulting buildup on the nozzle has sometimes caused the termination of the atomization process. This termination has resulted from closing off of the hole through which the melt is poured or by at least partially diverting the atomizing gases from direct impingement at high energy onto the emerging stream of liquid metal. In severe cases, the buildup of solid deposit at the nozzle tip has caused the buildup deposit to break away from the nozzle. In such case, the result has sometimes been a contamination of the powder being formed with material from the nozzle or from the melt delivery system.

In conventional apparatus, the problem of the build up of solidified high temperature material at the gas nozzle or at the molten metal orifice is solved by keeping the gas nozzle fairly remote from the atomization region as explained more fully below.

The problems of a progressive accretion of numerous specks and globules of solidified melt on the atomizing nozzle is most acute for the very high temperature melts and particularly for the molten metals which have high melting temperatures.

LOWER TEMPERATURE PRIOR ART ATOMIZATION

There is a great deal of difference between the practices which may be employed with low temperature materials in forming sprays by means of impingement of streams of gas on streams of liquid and the phenomena which occurs at elevated temperatures. In general, the idea of a low temperature spray may include materials which are liquid at room temperature and those which become liquid at temperatures up to about 300° C. The atomization of materials at these lower temperatures and particularly of materials which are liquid at room temperature is not attended by the occlusion of frozen metal on the spray nozzle to anywhere near the degree which occurs when high temperature molten metals or other high temperature materials are employed. Accretion of lower temperature material on an atomization nozzle does not lead to destruction of elements of the nozzle itself. Also, at the lower temperatures, there is far less reaction and interaction between the metal being atomized and the melt delivery tube or the materials of other parts of the atomization nozzle. A metal melt delivery tube can be used to atomize materials at or below 300° C. but ceramic delivery systems must be used at the higher temperature of 1000° C., 1500° C. and 2000° C. and above.

Another difference is that the thermal gradient through the wall of a melt delivery tube from the melt to the atomizing gas increases as the temperature of the melt to be atomized increases. For an atomization system of constant geometry, greater gas flow is required as the heat of the melt is increased because of the greater quantity of heat to be removed. A greater quantity of gas per unit volume of melt atomized can cause greater tendency toward spattering and splashing of the melt in the apparatus. Where the melt is very hot, of the order of a thousand degrees centigrade or more, a droplet can solidify and adhere instantly to a lower temperature surface. At the higher temperatures, materials are more active chemically and can form stronger bonds at surfaces which they contact than molten materials at lower temperatures.

CONVENTIONAL GAS ATOMIZATION

Remote Coupling

While the applicant does not wish to be bound by the accuracy of the representation or description which is given here, it is believed that it will be helpful in bringing out the nature and character of the present invention to provide a general description of atomization mechanisms as have been referred to and described in reference to the prior art and to provide a graphical representation of the phenomenon which occurs as prior art atomization takes place. For this purpose, reference is made to FIG. 4 which is a schematic representation of a prior art atomization phenomenon as it is understood to have occurred as prior art methods were employed. In the figure, two gas orifices 30 and 32 are shown positioned relative to a melt stream 34 in a manner which has been conventional in the prior art. Specifically, the jet gas nozzles 30 and 32 are spaced a distance from the melt stream and are also angled so that they are directed toward the melt stream at a substantial distance from the nozzles. This figure is somewhat schematic and it will be understood that the nozzles 30 and 32 could in fact form a single annular nozzle surrounding the melt delivery apparatus and could be fed from a conventional gas plenum. The melt delivery apparatus 36 is also shown in a schematic form.

There is a phenomena recognized in the prior art of the formation of an inverted hollow cone in the melt stream as it descends to the area where the confluence of the gas from the respective gas jets 30 and 32 occurs. The point of confluence 38 is the point at which two center lines or aimpoints of the two streams of gas could meet if there were no interference between them. They do, however, act on the melt stream as it descends and part of this action is the formation of the inverted hollow cone illustrated at 40 in the figure.

The next phenomena which occurs in the conventional atomization process is the disruption of the cone wall into ligaments or globules of melt. This phenomena occurs in the zone shown as 42 in the figure.

The next phenomena which occurs in conventional atomization is the breaking up or atomization of the ligaments into droplets. This is shown in the figure as occurring generally in the zone below that in which the ligaments are formed. The individual droplets or particles are represented as formed from larger droplets or globules.

According to this schematic representation, the conventional atomization is a multi-step multi-phenomena process, the first phenomena of which is the formation of the inverted cone; and the second phenomena of which is the disruption of the cone wall into the ligaments; and the third phenomena of which is the disruption of the ligaments into droplets.

So far as the droplet formation is concerned, it is seen from this description to be a secondary phenomena in the sense that a very high percentage of the droplets are formed by disruption of the ligaments or globules.

The most definitive work on the remotely coupled atomization of liquid metals cited in the technical literature is entitled "The Disintegration of Liquid Lead Streams by Nitrogen Jets" by J. B. See, J. Rankle and T. B. King, Met. Trans. 4 (1973) p. 2669–2673. This work describes the atomization phenomena based on studies made with the aid of speed photography.

What is distinct and novel about the process of the subject invention is that the process has a greatly reduced secondary particle formation and has a very high degree of primary direct formation of particles immediately from the melt and without the need to go through a second stage of subdivision of the melt as is illustrated in schematically in FIG. 4 and described above.

CONVENTIONAL ATOMIZATION

Loss of Gas Energy

To avoid having such high temperature droplets adhere to the portion of the apparatus which is cooled by the gas supply mechanism, prior art high temperature atomization apparatus has supplied the gas from a jet or jets which are relatively remote from the surface of the stream itself impacted by the jets.

Where the nozzle is remote from the atomization region there is an appreciable reduction in the energy of the gas as it moves from the nozzle from which it is delivered to the point of impact with the liquid metal to be atomized. There are substantial diffusion and entrainment losses as the gas traverses the distance from the nozzle to the melt stream. The energy loss has been estimated to be in excess of 90% of the initial energy for certain designs of the molten metal atomizing equipment currently in use. Accordingly the processes employing gas jets remote from contact with a stream or body of molten material to be atomized are uneconomical in usage of gas, as much gas is needed to overcome the loss of energy which occurs in the stream of gas before the molten metal stream is contacted.

Such remote coupling of a melt stream to atomizing gas supply orifices are illustrated and described in U.S. Pat. Nos. 4,272,463; 3,588,951, 3,428,718, 3,646,176, 4,080,126; 4,191,516 and 3,340,338 although not described in terms of remote coupling.

DISCUSSION OF THE PRIOR ART

Use of metal and even plastic nozzles having the gas jet very closely proximate the liquid supply tube or orifice has been known heretofore. For example atomization of liquid at room temperature can be accomplished without serious freezing and build up of the liquid on the nozzle. Some paint spray nozzles for example have this type of construction.

In the book entitled "The Production of Metal Powders of Atomization" authored by John Keith Beddow and printed by Hayden Publishers, there is a reference made on page 45 to various designs of nozzles for the production of powder metal from a molten metal stream. Such atomization involves high temperature gas atomization.

The Beddow nozzles are annular nozzles in that they have a center port for the development and delivery of a liquid metal stream. The gas is delivered from an annular gas jet surrounding the center port. The Beddow nozzles have a superficial similarity to that illustrated in FIG. 1 of this specification. The problem of buildup on annular nozzles such as those disclosed in Beddow is pointed out immediately beneath the figures on page 45 as follows:

> "One important problem with annular nozzles is that of 'build-up' on the metal nozzle body. This is caused by splashing of molten metal onto the inside of the nozzle, especially near the rim at the bottom. This splashed metal freezes, more liquid metal accretes and at some later stage of this process the jet of air causes the hot metal build-up to ignite. In this way the operator can lose a nozzle block rather easily."

Thus, although such nozzle design has been known, prior art practitioners of this art have not been able to overcome the problem recited by Beddow in the gas atomization of high temperature material and particularly metals.

Other sources of information on the configuration of nozzles for use in atomization technology are found in U.S. patents. In U.S. Pat. No. 2,997,245 a method of atomizing liquid metal employing so-called "shock waves" is described.

In U.S. Pat. No. 3,988,084 a scheme for generating a thin stream of metal on a hollow inverted cone and intercepting the stream by an annular gas jet is described. In the scheme of U.S. Pat. No. 3,988,084 the atomization gas stream is directed against only one side of the cone of molten metal, i.e. the exterior of the cone, and no gas is directed against the other side of the cone of molten metal, i.e. the inside surface of the cone of molten metal. In the practice of certain modes of the present invention atomizing gas is directed against all surfaces of the melt stream. The inverted cone of the U.S. Pat. No. 3,988,084 resembles the inverted cone formed during conventional remotely coupled gas atomization of a descending liquid metal stream described above in that the gas acts on only one side of the web of liquid metal at the lower edge of the inverted cone. The web spreads over the inverted cone to its edge and the gas sweeps metal from the edge into a hollow converging cone.

The inventor of this application prepared a thesis entitled "The Production and Consolidation of Amorphous Metal Powder" and submitted the thesis to the Department of Mechanical Engineering at Northeastern University, Boston, Mass. in September, 1980. The thesis describes the use of an annular gas nozzle with a ceramic and/or graphite metal supply tube. In this thesis improvements in the production of powder having a higher proportion of finer powder from the atomization of molten metal with an annular jet of gas is reported.

BRIEF SUMMARY OF THE INVENTION

An object of the present invention is to produce fine metal powder directly from the liquid state and without necessarily employing a secondary process such as commutating or otherwise subdividing material formed initially in a ribbon or foil or strip of similar solid state.

Another object is to produce powder from a melt with a substantially higher percentage of finer particles.

Another object is to produce powder directly of more uniform particle size.

Another object is to produce powder by gas atomization more efficiently.

Another object is to provide a method and apparatus for more efficient production of powder of desired particle size by gas atomization.

Another object is to produce powder from higher temperature melts at low cost.

Another object is to produce useful articles of powder derived from alloys which cannot be made by conventional techniques into useful articles.

Another object is to make possible production of powder by rapid solidification techniques for use in forming novel articles of manufacture.

Another object is to produce new and distinct powder from a melt by gas atomization and to do so economically.

Another object is to provide a method of limiting the accretion of melt on atomizing apparatus.

Another object is to provide a method which permits long term continuous runs of atomizing apparatus.

Another object is to provide a method of gas atomization which uses less gas.

Another object is to provide a method of gas atomization which is less subject to fouling of atomization apparatus.

Another object is to provide a method which can yield a narrower spectrum of particle sizes in powder product.

Other objects will be in part apparent and in part pointed out in the description which follows.

In one of its broader aspects, these objects can be achieved by providing an atomization apparatus including a source of melt and tube means for delivering the melt to an atomization zone, providing a supply of atomizing gas and supplying said gas continuously to the atomization zone into contact with the external surface of the melt supply tube, and shaping the tube exterior to redirect the gas as it approaches the melt.

BRIEF DESCRIPTION OF THE FIGURES

The description of the invention to follow will be better understood by reference to the accompanying drawings in which.

DESCRIPTION OF A PREFERRED EMBODIMENT

Illustrative Atomization Nozzle

Figure 1:
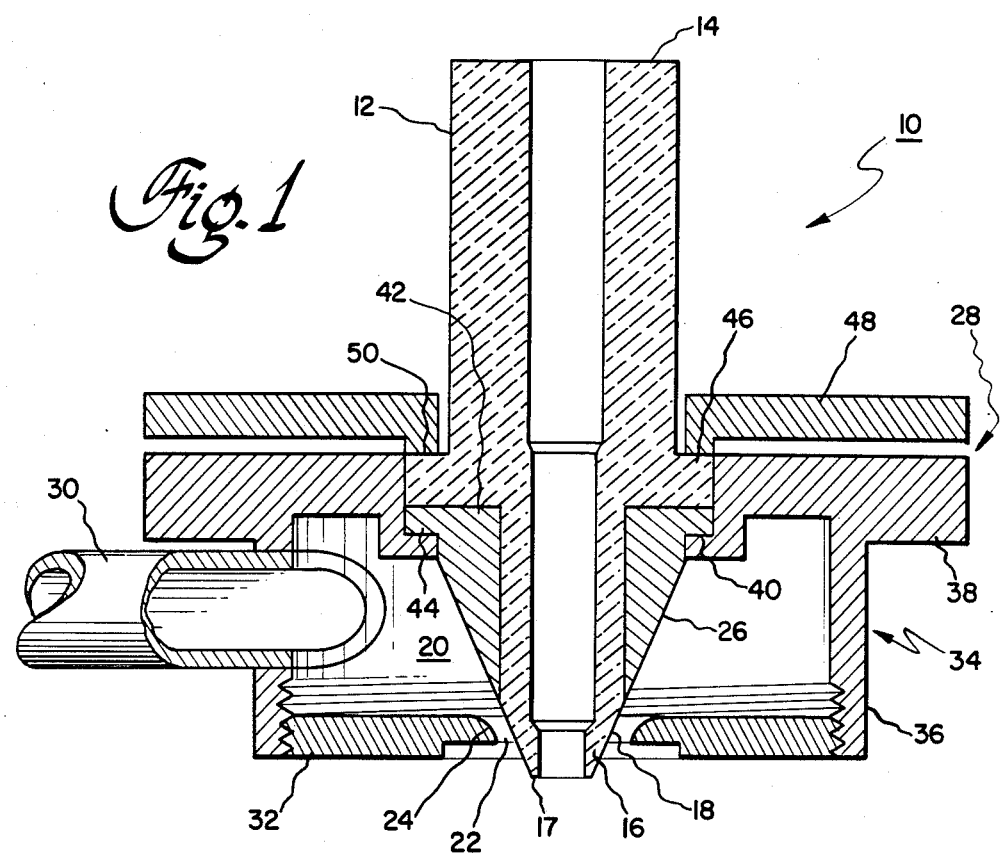
FIG. 1 is a vertical sectional view of one type of gas atomization nozzle useful in the practice of the present invention.
Figure 2:
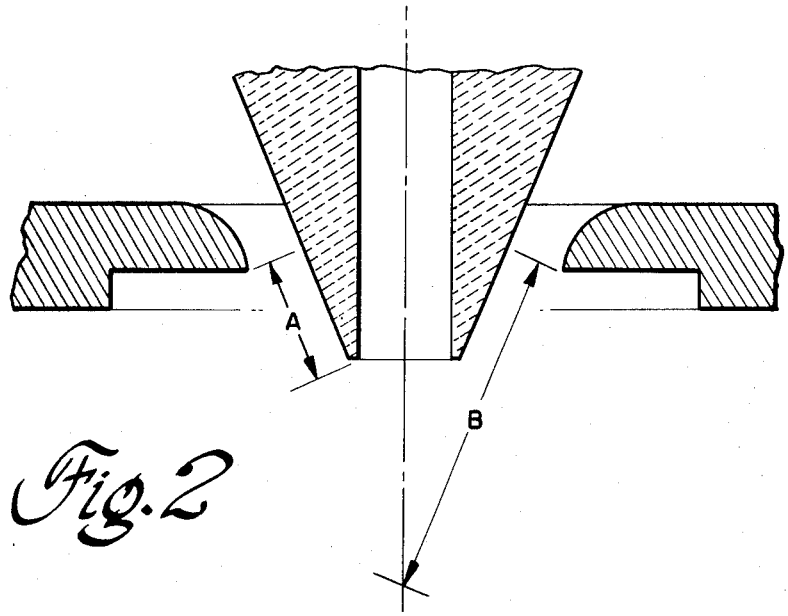
FIG. 2 is a detail of the atomization tip as in FIG. 1 illustrating certain dimensions A and B.
Figure 3:
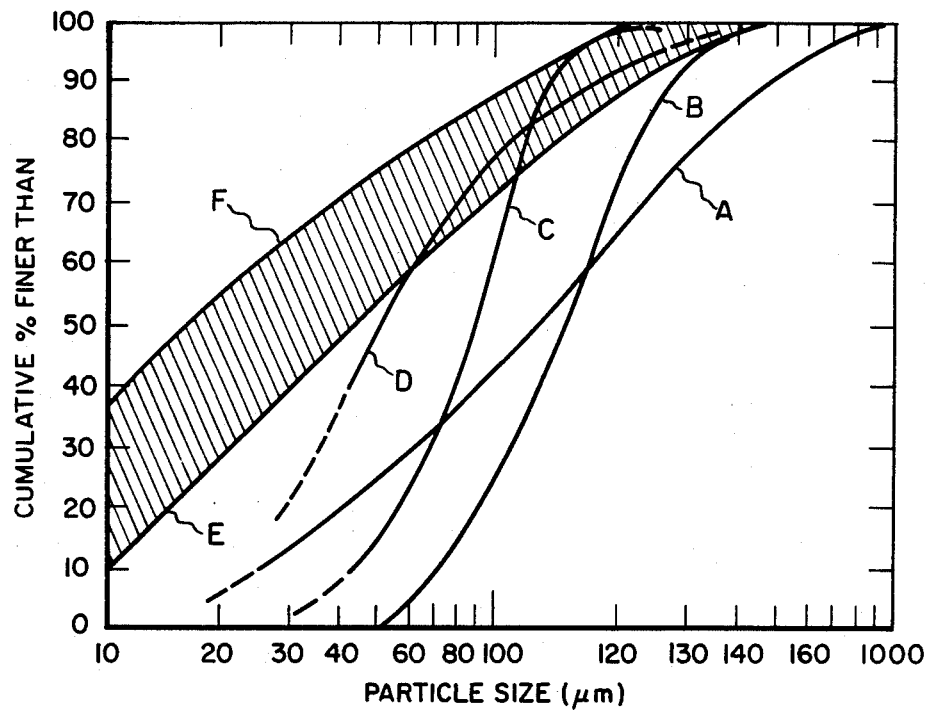
FIG. 3 is a plot of certain parameters relating to particle size distribution of the cumulative fraction of particles in powder samples prepared by different methods.
Figure 4:
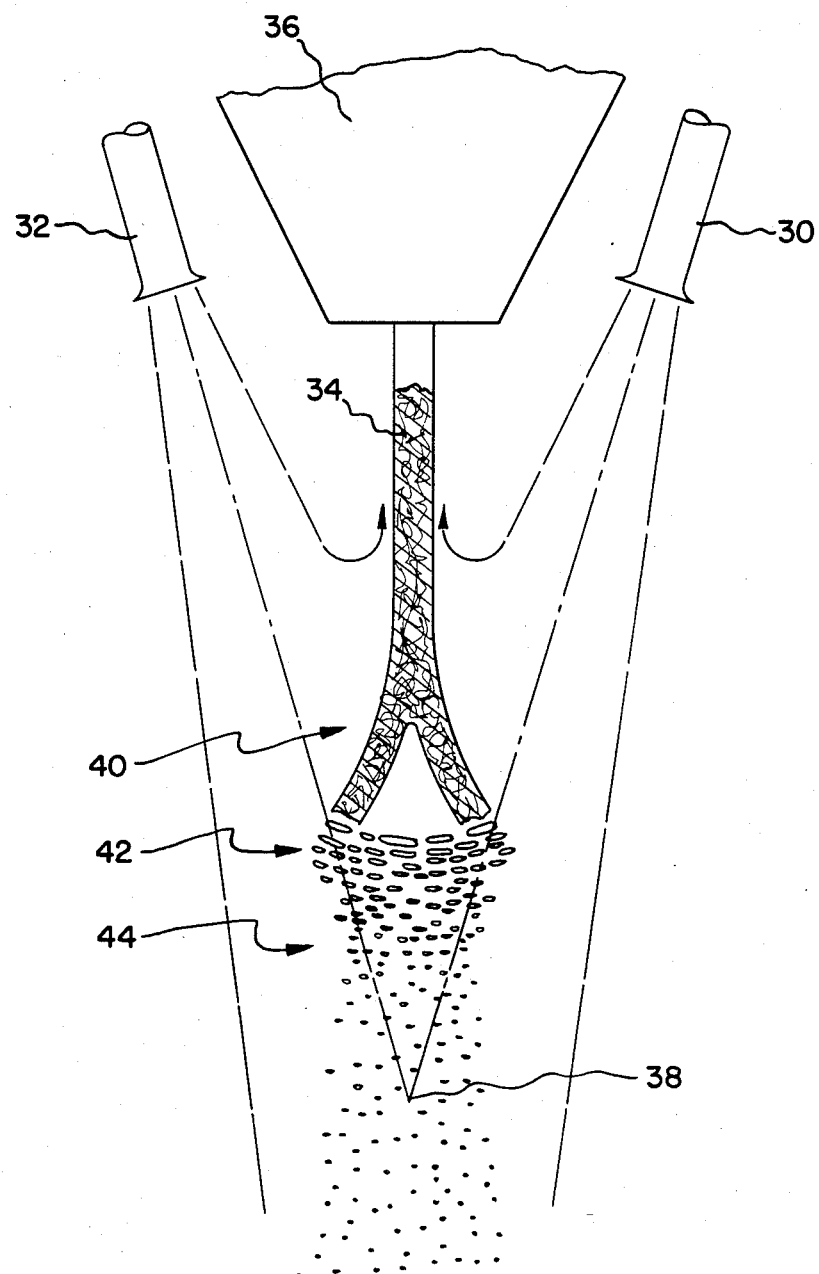
FIG. 4 is a schematic illustration of a prior art atomization phenomena.

Referring to FIG. 1, there is illustrated in vertical section one form of a atomization nozzle 10. Numerous modifications of the forms of atomization nozzles may be employed in practicing this invention, all as described elsewhere in this specification.

The nozzle 10 is illustrated as having an inner ceramic liner 12 having an upper end 14 into which liquid metal to be atomized is introduced, and a lower end 16 from which the metal to be atomized may emerge as a descending stream. The lower end is provided with a lower tip 17 having tapered outer surface 18 in the shape of an inverted truncated cone. The molten metal emerging from tube 12 at end 16 is swept by gas from an annular gas orifice portion of the nozzle 10. The annular gas jet is made up of gas streaming from a plenum chamber 20 downwardly through an opening 22 formed between an inner beveled surface 24 and the inverted conical or beveled surface 18 of metal supply tube 12. The annular orifice or port 22, for exit of jets of gas may have surfaces formed in a beveled shape to conform generally to the beveled surface 18 of the melt guide tube 12. Accordingly, the opening 22 may be defined by the outer beveled surface 18 of liner 12, the corresponding beveled surface 26 of the upper portion of the annular gas plenum 20 and the confronting and opposite surface 24 on plate 32 forming the lower closure of plenum 20. The lower surface 18 of liner 11 forms one side of a small land 19. The other side of land 19 is formed by the melt orifice 15 also contained in 12.

By supplying a gas at high pressure through the gas conduit 30 from a source not shown, the gas enters the annular plenum chamber 20 and emerges from the annular gas orifice 22 to impinge on the stream of molten metal descending through the tube 12 and emerging from the end 16 of the liner 12 at tip 17.

Exit surface 24 may conveniently be formed on the inner edge of a plenum closure plate 32. Plate 32 may have external threads to permit it to be threaded into the lower internally threaded edge 36 of plenum housing sidewall 34. The raising and lowering of plate 32 by turning the plate to thread its inner edge further into or out of plenum 20 has the effect of moving surface 24 relative to surface 18 and accordingly opening or closing annular orifice 22 as well as raising the orifice relative to the lower tip 17 of melt deliver tube 12. The plenum housing 34 is made up of an annular top 38 having an integrally formed inner shelf 40. An annular cone 42, which may suitably be a ceramic, or metal, and is part of melt guide tube 12, is supported from shelf 40 by flange 44. The shape of outer surface 26 of cone 42 is significant in forming the inner annular surface of plenum 20 from which gas is delivered to annular orifice 22. The outer surface 26 of cone 42 may be aligned with the outer conical lower end surface 18 of tube 12 so that the two surfaces form one continuous conical surface along which gas from plenum 20 passes in being discharged through annular orifice 22.

As indicated tube 12 has bottom tip 17 and an outer lower surface 18 conforming to the inner surface 26 of annular cone 42. It also has a mid-flange 46 which permits its vertical location to be precisely determined and set relative to the overall nozzle 10 and to conical surface 26.

An upper annular ring 48 has an inner depending boss 50 which presses on flange 46 to hold the tube and cone parts of the device in precise alignment.

The means for holding the nozzle assembly in the related apparatus in which molten metal is atomized is conventional and forms no part of this invention.

The configuration and form of gas orifice useful in practice of the present invention is not limited to the form illustrated in FIG. 1. For certain applications a nozzle in the form of a Laval nozzle will be preferred to control expansion of gas released from the orifice 22 of FIG. 1.

Further the annular jet of gas need not be formed solely by an annular orifice although such orifice is preferred. Rather the annular jet can be created by a ring of individually supplied tubular nozzles each directed toward the melt surface. The gas of such a ring can form a single annular gas jet as the gas from the individual nozzles converge at or near the melt surface.

Further the angle at which gas is directed from a gas orifice toward a melt stream surface is not limited to that shown in the figure. While some angles are prepared for certain combinations of nozzle design and melt to be atomized, it is known that atomization can be accomplished with impingement angles from a fractional degree to ninety degrees. I have found that atomization with a nozzle as illustrated in FIG. 1 at an angle of incidence of 22° is highly effective in producing higher concentrations of fine powder than prior art methods.

ADVANTAGES OF SMALL PARTICLES

For many metals which are atomized a more rapidly solidified droplet or particle will show an improvement in some properties as compared to a more slowly cooled particle. As is pointed out in the background statement the rate of rapid solidification goes up as the particle size is going down. So finer powder involves getting increased solidification rates and not just finer powder per se. Finer powder per se has other advantages over conventional materials.

With respect to getting higher solidification rates one of the common observances is a vast decrease in segregation of the constituents of an alloy from which the particle is formed. For example, as a result of that decrease in segregation one can raise the incipient melting point of the alloy. The incipient melting point is raised essentially because the present method makes possible a homogeneous nucleation event which means essentially that the solidification will occur virtually instantaneously so that the solidified front will move rapidly through the liquid material of the droplet without segregation occurring. The net effect is a homogeneous structure. By getting a homogeneous structure the difference between the liquidus temperature of the alloy and the solidus temperature of the alloy is reduced and ultimately they can approach one another. The benefit of that is that ultimately the incipient melting is the solidus temperature. That has been moved up and also the potential operating temperature of the alloy has been raised. With powder prepared in this manner, one can get successful consolidation with improved properties with the consolidation techniques that exist today.

If in trying to consolidate a rapidly solidified fine amorphous powder by the types of techniques that have been used in the past one goes above the transition temperature the material crystallizes. So one can't consolidate the material and retain the amorphous structure for most amorphous alloys. Some amorphous alloys have been consolidated but in the case of superalloys, these remain crystalline in the rapidly solidified form, these have been consolidated and some increase of beneficial properties have been observed in the consolidated material and especially in rapidly solidified tool steels.

Considering a sample of very finely divided powder, even if the effects of cooling rate are eliminated and just dealing in terms of particle size, the fact that each particle originates from the melt and assuming that the melt is homogeneous, and allowing segregation to occur if one has a very small particle one is going to see less segregation potentially than in a very large particle simply by the definition of the material available to segregate.

Secondly with respect to advantages of small particle size it has been shown in the literature that smaller metal particles tend to sinter sooner at lower temperatures and in shorter times than large powder particles. There is a greater driving force for the sintering process itself. That is an economic advantage.

Thirdly one of the problems associated with powder metallurgy is contamination of the powder by foreign objects. These foreign objects get mixed into the powder and then pressed up into the part and ultimately represent a potential failure site in the part. If one has very fine powder the common belief is that one can sift the powder and eliminate these big foreign objects so that by having a finer powder one can prepare a final specimen that will have potentially smaller defects in it than if coarse powder were used.

Further considering other advantages of fine powder, if it were available at economic prices, and if one assumes 10 micron spheres versus 100 micron spheres, the packing factor is the same. Accordingly it is desirable to have another set of smaller spheres to put into those voids. But there will be voids again between the smaller spheres and the big spheres so that one would like another set of smaller spheres to fill in the smaller voids.

A relatively new area that has evolved because of rapid solidification is the development of whole new series of alloys. Because of the slower solidification rates of conventional materials the constituents of the alloy segregate out as either brittle intermetallic compounds or as long grain boundaries. Such materials have properties which are inferior in some aspects to rapidly solidified material.

By means of rapid solidification some of these solute materials can be kept in solution and can act as strengtheners and as a result one is now looking at new alloy compositions through rapid solidification. These same alloys when made through conventional practices may have to be discarded because they were brittle. However it is now found that these alloys have useful properties if rapidly solidified. This phenomena varies from alloy system to alloy system, solidification rate to solidification rate. Ultimately consolidation techniques affect whether you can use the material or not as well.

An important feature of the present invention is that it permits the formation of powder from a melt with high efficiency in the utilization of gas. The improvement which is obtained is quite surprising in that the finely divided powder has a higher percentage of the fine particles and it might be reasonable to assume that in order to achieve such a fine subdivision a much higher gas flow would be needed. With a much higher gas flow there would of course be a reduction in the efficiency of gas utilization. However, surprisingly I have found that by the use of the processes taught in this specification the gas utilized actually decreases when the very fine particles are produced in the higher percentage made possible by this invention compared to conventional processes.

PARTICLE SIZE PARAMETERS

Narrow Range of Sizes

In general there is an advantage in having powders having fine particles of relatively uniform size or with a smaller range of sizes. This is because the more uniform size particles will have seen a more uniform cooling history. The more uniform cooling history translates into the particles being more uniform in metallurgical properties.

Also, generally the smaller size particles are more rapidly cooled particles as set forth in the equation in the introduction to this application. Where a wide range of particle sizes is present in a powder and the powder is processed through powder metallurgy techniques there is a limit on the desirable properties which can be imparted to a composition and this limit is related to the composition and properties of the larger particles of the powder which goes into the composition. The larger particles will constitute a potential weak spot or spot at which lower values of incipient melting or other lower value of properties will occur.

As a general rule the smaller the particle size and the smaller the average particle size and the more uniform the size of smaller particle powder of an ingredient powder used to form a solid object the more likely that the product obtained will have certain combinations of desirable properties in solid objects prepared from the powder. Ideally if all particles formed were exactly 20 microns in diameter they would all have seen essentially the same thermal history and the objects formed from these particles would have properties which were characteristic of the uniform size particles from which they were formed.

It would, of course, be desirable to have larger particle bodies which have been rapidly solidified at the rates which are feasible with smaller particle bodies. However, because of the internal segregation of the metallurgical ingredients which occurs within a larger particle body as the larger bodies are solidified, and because there is a limit on the rate at which heat can be removed from the larger particle bodies in order to achieve such solidifications, the formation of such larger particle bodies from molten metal, as powder is formed by conventional atomization techniques, presents a limitation on the character of powder which can be produced by conventional techniques as well as a limitation on the uses which can be made of such powder in forming larger bodies by powder metallurgy. The use of powder metallurgy techniques is presently the principal route by which superior products are achieved using powder subjected to rapid solidification. The present invention improves both the formation of such smaller particles and the formation of larger bodies with the highly desirable combination of properties of rapidly solidified metals. Further, the articles formed have a more uniform set of properties because of the more uniform particle size of the particles of the powder from which the particle is formed.

One of the unique features of the technology made possible by the present invention is that it permits a closer control of a number of the parameters of a power product produced by atomization as taught in this application.

For example, it has been found possible to alter the somewhat random distribution of particle sizes which is found in the powder products of prior art processes to permit a greater concentration of particle size of a selected value.

Secondly for a selected particle size the possibility of producing a higher yield of the size from a given run is made possible regardless of the size of particle which is selected. If, for example, particles of 10 micron is selected as the principal product size for a powder, the control of the variables of the subject invention will make possible an emphasis in the production of the particles of that selected size. Alternatively if particles of 50 microns or 100 microns are selected as the desired product size then the process parameters can be altered in accordance with the teaching of this invention to produce powders which have higher concentrations of the particles within the selected size range.

By use of prior art processes it is possible to produce a wide range of particle sizes in any one lot or from any single run. The economic advantage, however, is in being able to produce a particle size with a relatively narrow standard deviation from a selected or preselected particle size product. Accordingly, the present invention makes possible the production of economically more valuable powders from a given run involving the consumption of a certain amount of energy and materials.

A derivative benefit of producing powder according to the teaching of this invention is that it not only makes possible the production of powder with a relatively tight particle size distribution but because of the tight distribution the particles will have a selected microstructure. Accordingly it is possible through use of this teaching to form particles having a relatively large particle size and a tight distribution of sizes within a given sample. The larger particles because they will have undergone slower cooling will have coarser crystalline structure than those which have more rapid cooling.

Alternatively, however, by selecting those conditions which produce the finer particle size it is possible to produce a powder which is amorphous because the smaller particles are cooled more rapidly as is explained above and also because there is a very tight size distribution around the preselected size for the sample being produced.

PREFERRED EMBODIMENT

Illustrative Atomization

An atomization zone is formed at the area of confluence of the molten metal stream and the annular stream of atomizing gas emerging from the annular opening 22 at the bottom of the gas supply plenum 28. Accordingly, the melt guide tube 12 delivers the liquid metal stream through the throat of the gas nozzle to the atomization zone. One element of the present invention is the provision of a gas nozzle body which cooperates with a shaped end of a melt guide tube to form a gas nozzle having an annular gas jet which works in cooperation with the shaped exit end of the melt guide tube.

In other words, the provision of shaped and configured and cooperative ends at the lower part of the melt guide tube is one element of this invention as is explained more fully herein. This is one of several independently variable phenomena which are used in achieving superior atomization of a variety of melts.

The close positioning of the gas orifice and melt orifice permits the surface of the melt guide tube to form a part of the annular gas orifice and by doing so permits the jet of gas emerging from the gas plenum to escape over the formed end of the melt guide tube. This sweeping action of the gas jet on and against the lower end of the melt guide tube has been found to be effective in carrying off to a large degree particles of freezing or frozen metal which might otherwise tend to form or to deposit and accrete on the lower end of the melt guide tube. I have no knowledge that such particles do not in fact accrete on the lower end of the tube and it is known that such adherence occurred to prior art atomization nozzles as is discussed above relative to the Beddow reference. However, because of this measure which are taken as one of several combined elements in the practice of this invention, the adherence of such liquid or frozen particles is reduced and there is an ability of the sweeping gas to either prevent deposit of such particles or to cause their removal once they are deposited or accreted on the lower end of the melt delivery tube.

In the particular configuration shown in the FIG. 1 drawing there is a continuity, conformity and alignment between the formed lower surface of the melt guide tube 18 and the formed surrounding surface 26 of the gas supply plenum 20. It will be understood that the annular gas jet can, in fact, be made up in a number of configurations and in a number of ways. However, the important feature which must be provided pursuant to this aspect referred to herein as close coupling, is an annular gas jet which is at least in part formed by the lower formed end of the melt guide tube and proximate to the melt surface.

Redirected Surface Flow

Essentially for gas flowing parallel to a flat surface, the gas has a velocity component principally in one direction. After finite travel along the surface it is possible for the gas stream to lift off the surface and at the intersection between the surface and the flowing gas one will get the formation of eddy currents. These eddy currents are almost circular flows of gas. In the region where such eddy currents exist the gas flow at the solid surface due to the eddy current can be or is in the reverse direction of the main stream of gas flow.

The eddy currents are more prevalent in the gas flow sequence with turbulent flow than with laminar flow. As the static pressure of the gas increases the tendency for these eddy currents to form or for flow separation to occur is decreased. At higher pressure there is a lower tendency toward flow separation. With respect to the outside surface of the melt delivery tube, what happens is that as the gas moves along, it is redirected by the changing contour and changing flow direction of the end surface. This change of direction causes a compression zone in the gas at the contoured melt tube end surface and causes a local buildup in static pressure. The pressure pushes the gas down against the surface. That is the reason for the redirection. If redirection of the surface is into the gas flow it acts to eliminate flow separation. If the surface redirection is away from gas flow it will create flow separation. It will increase flow separation or create it if it hasn't already occurred.

CONCAVITY OF MELT DELIVERY TIP EXTERNAL SURFACE

One way in which the stagnant layer can be swept from the exterior surface of the tube is by altering the surface configuration so that the gas must change direction at it contacts and sweeps across the tube surface. For example, if the angle of the wedge and the angle of the tube surface relative to that of the surface of the metal emitted from the tube is of the order of 15° there is a noticeable tendency for a buildup of solid deposits on the tube surface whereas under the same conditions of melt flow and gas flow and configuration of the surfaces and tubes there is noticeably less or no buildup of solid particles on a surface which is formed at an angle 22° to the direction of emergence of the melt. In other words if the wedge is 15° or less a buildup of particles does occur on the surface. Under the same set of conditions using an angle of 22° there is essentially no buildup of particles on the exterior surface of the tube.

Turning now to a consideration of the FIGS. 5 and 6, it will be recognized that the nozzle structures illustrated, closely resemble that of FIG. 1 in all respects except one as described below. Accordingly, like numbers are employed in describing parts of the nozzle structures of FIGS. 5 and 6 as are employed in describing parts of FIG. 1 above. The parts also have essentially the same functions as are described above in relation to FIG. 1.

The important difference concerns the external surfaces 18 of the melt delivery tube and the internal surface 26 of the plenum.

Surprisingly, it has been found that relatively small differences in the angle at which these surfaces are formed relative to the tube axis (or melt axis) can cause relatively large differences in nozzle performance.

In FIG. 1, the beveled surfaces 18 and 26 are formed with an common angle to the melt tube axis. The angle is 22° as is evident from the Figure. This is, accordingly, a simple uniform angle at which gas flows along the surface to impact with the surface of the emerging melt.

Figure 5:
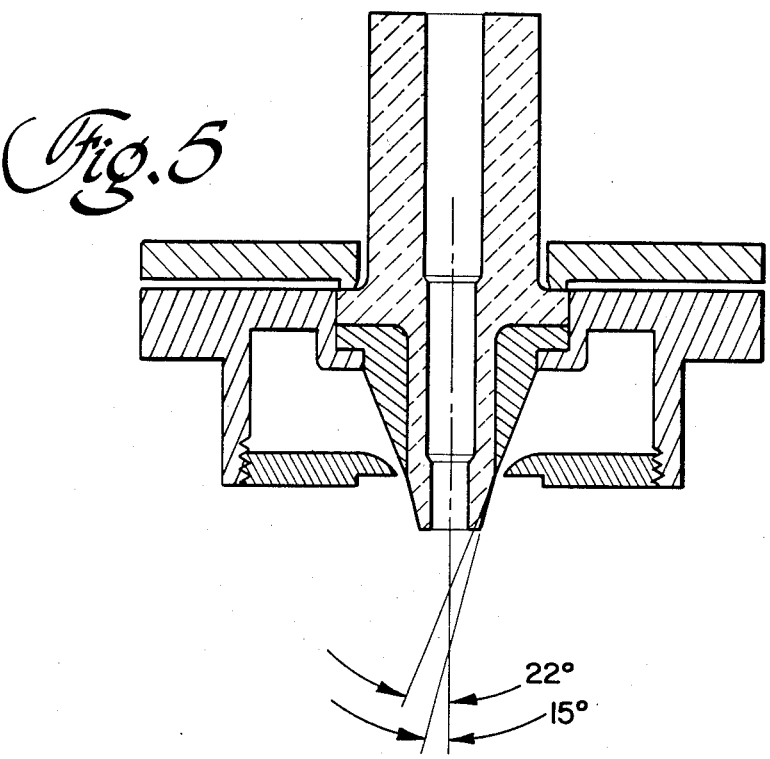
FIG. 5 is a vertical section of an atomization nozzle as in FIG. 1 but slightly modified.

In FIG. 5, the angle of surface 26 to the tube axis is 22° but the angle of the surface 18 to the tube axis is lower and is 15°. Accordingly, gas passing along and over this combination of surfaces is redirected in its movement as it leaves surface 26 and starts to move over surface 18. The pressure at the surface 18 is increased slightly as the moving gas makes this transition. The formation of a turbulent wave and resultant swirling eddy currents are reduced and the surface 18 is rendered less subject to deposit of accreted metal or frozen melt. It has been found, in actual use of such a nozzle with this concave combination of nozzle surfaces, that less accretion does occur on the surface 18 and that, following a run, the surfaces of 18 were quite clean.

Figure 6:
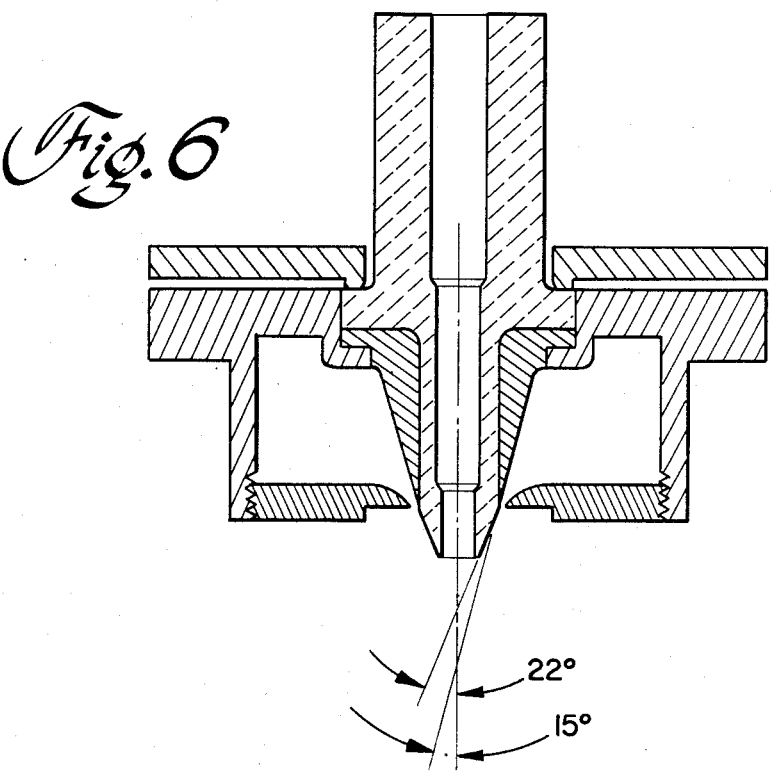
FIG. 6 is also a slightly modified atomization nozzle.

By contrast, the surfaces of the tube surface 18 of a nozzle, as depicted in FIG. 6, became quite fouled and discolored in actual use and significantly greater accretion occurred on the surface 18 than occurred on the same surface of the nozzle of FIG. 1 or FIG. 5. As is illustrated in FIG. 6, the surface 26 of the plenum line was 15° to the tube axis. The external surface 18 of melt delivery tube is at an angle of 22° to the tube axis.

The concave external surface of the melt delivery tube and related surface of the spacer 42 redirect the gas flow to effectively limit and restrict accretion on the surface 18 of the nozzle.

What is claimed and sought to be protected by Letters Patent of the United States is:

1. A high temperature atomization nozzle comprising:
   a melt delivery tube adapted to deliver a solid stream of melt, said tube being supported centrally of said nozzle for delivery of a melt to an atomization zone into which the melt delivery orifice end of said tube extends;
   the outer surface of the orifice end of said tube having a concave configuration to deflect the flow of gas directed thereagainst; and
   a gas delivery system including a gas nozzle for delivery of gas against the concave surface of said tube and into the melt exiting from said tube.

2. The nozzle of claim 1, wherein the concavity of the surface is a relatively small angle.

3. The nozzle of claim 1, wherein the concavity of the surface is between 3° and 12°.

4. The nozzle of claim 1, wherein the concavity is of the order of 7°.

* * * * *